United States Patent [19]
Erhard

[11] Patent Number: 5,069,193
[45] Date of Patent: Dec. 3, 1991

[54] IGNITION PROCESS, ARANGEMENT AND APPARATUS FOR INTERNAL COMBUSTION ENGINES WITH A MAGNETO

[75] Inventor: Werner Erhard, Cadolzburg, Fed. Rep. of Germany

[73] Assignee: Prüfrex-Elektro-Apparatebau Inh. Helga Müller geb. Dutschke, Cadolzburg, Fed. Rep. of Germany

[21] Appl. No.: 555,279

[22] Filed: Jul. 19, 1990

[30] Foreign Application Priority Data

Jul. 29, 1989 [DE] Fed. Rep. of Germany ....... 3925224
May 31, 1990 [DE] Fed. Rep. of Germany ....... 4017478

[51] Int. Cl.$^5$ .......................... F02P 3/08; F02P 5/145
[52] U.S. Cl. .................................... 123/602; 123/335; 123/599
[58] Field of Search ............... 123/149 R, 149 C, 599, 123/600, 602

[56] References Cited

U.S. PATENT DOCUMENTS

| | | | |
|---|---|---|---|
| Re. 31,837 | 2/1985 | Burson | 123/599 X |
| 3,367,314 | 2/1968 | Hirosawa et al. | 133/600 |
| 3,941,111 | 3/1976 | Carmichael et al. | 123/600 |
| 3,960,129 | 6/1976 | Hofer et al. | 123/599 |
| 4,441,478 | 4/1984 | Fujimoto | 123/149 C X |

Primary Examiner—Tony M. Argenbright
Attorney, Agent, or Firm—Jordan and Hamburg

[57] ABSTRACT

An ignition method and system for internal combustion engines, especially in lawn mowers or chain saws, in which a magneto induces a plurality of alternating voltage half-waves for each engine revolution to charge an energy-storing element and to discharge it by a switch controlled by the primary coil of an ignition transformer. The switch is actuated when the first half-wave of each revolution reaches a trigger threshold. The ignition system induces the charging alternating voltage dependent upon the rotary position of the engine for the energy storage element and for discharging it via the switch for firing the spark synchronously with the alternating voltage. The system has a timer module which responds to the alternating voltage by producing a signal to block the ignition switch for the duration of a time interval which corresponds to a top speed limit of the internal combustion engine.

12 Claims, 7 Drawing Sheets

IGNITION PROCESS, ARANGEMENT AND APPARATUS FOR INTERNAL COMBUSTION ENGINES WITH A MAGNETO

FIELD OF THE INVENTION

The invention relates to an ignition process for internal combustion engines, especially in lawn mowers or chain saws, in which a magneto induces for every engine revolution a plurality of always coherent and alternately polarized voltage half-waves, by means of which an energy accumulating means is charged and is discharged by a switch means through the primary coil of an ignition transformer. The invention furthermore relates to a condenser ignition system for internal combustion engines having a magneto inducing speed-dependent alternating voltage and a trigger system sensing the alternating voltages and serving for the actuation of a switch discharging the condenser through the primary coil of an ignition transformer; this system is especially designed for the performance of the above-named process.

BACKGROUND OF THE INVENTION

In known ignition systems more or less of the kind mentioned above (cf. U.S. Pat. No. Re. 31 837) the inner leg of a three-legged ferromagnetic iron core is surrounded by a coil arrangement. In the latter a pole wheel, which is coupled to the rotating engine shaft and which bears in a peripheral position a tangentially aligned permanent magnet, generates a series of alternating voltage half-waves. The first of these half-waves is used to charge an energy accumulating condenser and only the last half-wave serves for the operation of a thyristor discharging the condenser through the spark coil. In practice, however, it is found that in this method of procedure, the spark is fired always later with respect to the absolute angular position of the magnet pole wheel as the rotary speed increases. Explanations of this phenomenon might lie in the eddy current and hysteresis losses in the polarity reversal of the iron core that precedes the spark firing, and in the encumbrance of the entire ignition system with capacitors and a low-pass filter.

SUMMARY OF THE INVENTION

In contrast, the invention is addressed to the problem of achieving with minimal complexity a spark advance that increases with increasing rotary speed. For the solution, it is proposed in accordance with the invention, in an ignition process with the characteristics stated above, that the switching means be actuated every time that the first induced half-wave reaches a triggering threshold within each revolution.

Fundamentally, as the engine speed increases, or the angular velocity of the magneto increases, the slope of the induced voltage half-waves becomes ever greater. During the second, third, fourth etc. half-wave, however, inertia and other dynamic shortcomings of the overall system, due among other things to the circumstances mentioned above (hysteresis losses, eddy current losses, capacitances, low-pass characteristics) manifest themselves; in any case, an increasing lengthening of the said half-waves in comparison to the first half-wave occurring within a revolution can be observed. Nevertheless, the spark has heretofore always been triggered on these prolonged half-waves, because formerly the first half-wave was awaited and utilized for charging the ignition condenser. In contrast, the invention takes the unorthodox approach of using the first half-wave from each revolution for triggering the spark, regardless of the state of charge of the ignition condenser. Consequently, in the first revolution of the engine no spark is fired for lack of energy in the condenser. Not until the first half-wave induction occurs within the second revolution of the engine is the switch means actuated for the discharge of the energy accumulating means which has been charged previously by the half-waves of the first revolution. This process is repeated accordingly with each additional revolution.

Expediently, the rising portion or ascending flank of the first half wave is used to operate the switching means and fire the spark. In a further development of the process of the invention, at least one of the half-waves following the first half-wave is blocked with regard to the actuation of the switching means. This makes it possible to assure that the spark will not be triggered repeatedly within one engine revolution.

Since, as a rule, magnetos known in themselves induce a series of several voltage half-waves, the technical problem arises as to how the triggering of the spark can be made to respond precisely to the first half-wave within a revolution. In accordance with the invention this problem is solved by providing a flag which is set by the last half-wave of each revolution such that it signals the release of the spark. The flag is a special sign which signals the occurrence of a certain event, namely the end of the last half-wave of the current revolution and the approaching half-wave of the next revolution. This invention can be implemented very easily with microprocessors, since they usually have internal registers for marker bits or state bits. It is advantageous for the flag to be reset at least with the second half wave of each revolution after the spark is fired, which involves blocking the ignition. This produces the result that no spark will be fired at the wrong moment if the electromagnetic field of a spark has accidentally changed the electronically created flag in the (microprocessor) circuit.

A condenser ignition system with the features stated above, which is especially suitable for the performance of the process explained, is provided in accordance with the invention with a bistable multivibrator switching circuit which on the basis of the last alternating voltage half-wave is shifted to a state for triggering the actuation of the discharge switch during the first half-wave of the next revolution. It is desirable that the last portion of the last half-wave, i.e., its curve or end, be used for setting the multivibrator circuit to the triggering state.

Digital switches such as flip-flops are sensitive to stray electromagnetic influences which can lead to the falsification of the state of the switch. This problem is countered by an improvement of the invention according to which the flip-flop switching circuit is shifted back to its original, starting state within each revolution on the basis of the second, and in some cases subsequent, half waves of the same polarity, thereby blocking the actuation of the switch. Not until the final half-wave of the current revolution, which according to the assumptions is of opposite polarity, is the flip-flop switching circuit reset for the release of the ignition. In this manner misfiring is prevented.

This periodic resetting of the flip-flop switching circuit is advantageous especially when, in accordance with another development of the invention, it is designed as a single-flank-triggered toggle flip-flop which is reset within each revolution on the basis of the second, and in some cases subsequent, half-waves of equal polarity, and on whose dynamic cycling input the first and any subsequent half waves of the same, opposite polarity act. Toggling flip-flops, of course, invert their initial state with each positive, for example, cycle flank (cf. TietzeSchenk, "Halbleiterschaltungstechnik," 8th ed., Springer-Verlag, p. 237). If due to an external disturbance an undesired shift of the flip-flop is caused, this cannot result in a misfire on account of the above-described precautionary resetting, especially when the latter occurs before the last half-wave of a revolution.

Advantageously the flip-flop switching circuit is connected with a short-circuiting switch such that, in the flopped-back initial state, it actuates the short-circuiting switch accordingly to suppress induced triggering half-waves. How additional, superfluous sparking is avoided, especially when the engine is in a rotatory position unsuitable for this purpose, does not need further explanation. In practice it has proven desirable to insert between the output of the flip-flop switching circuit and the input of the short-circuiting switch a delay circuit, in the form, for example, of an RC low-pass filter. This causes a lag in the closing or opening of the short-circuiting switch in order to compensate undesired effects due to delayed, induced half-waves.

To facilitate the construction of the ignition system (process and arrangement) according to the invention, it is desirable that the magneto induce the smallest possible number of voltage half-waves, since sometimes only the first voltage half-wave serves to trigger the spark and the subsequent half-waves have to be used for setting and/or resetting the flag or flip-flop. It helps in this regard if the system according to the invention is combined with a magneto known in itself (cf. DE-OS 36 08 740) which has a magnet pole wheel with tangentially offset poles, coupled to the engine rotation, and a fixedly disposed coil system cooperating therewith and having a ferromagnetic iron core. The idea is embodied to special advantage if the iron core has two legs aimed at the pole wheel, only one of which is surrounded by the coil system and includes a triggering coil for deriving the pulses triggering the spark. With this magneto configuration, a first positive, a second negative, and a third positive triggering half-wave is induced per revolution. The surprisingly advantageous effect in connection with the system of the invention outlined above is based on beginning and ending each half-wave cycle with a positive half-wave; the first half-wave, after the second engine revolution, can always build upon the residual magnetism still present in the iron core and which still remains after the last half-wave of equal polarity; this results in an especially steep initial flank on the first half-wave, since no remagnetization is necessary in the iron core. Practical experiments have shown that in this case a spark advance is possible by up to 30° between 400 rpm and 12000 rpm. The middle, or second, half-wave of opposite polarity can be associated with the above-mentioned safety function, namely the compensation of disturbances of the flag or flip-flop switching circuit by resetting it.

Another improvement of the invention which is advantageous in connection with the minimum number of induced half-waves consists in the fact that the power supply of the flip-flop circuit depends on the first and in some cases subsequent half-waves. In the case of three half-waves per revolution, as in the example explained above, this means that the flip-flop switching mechanism is inactivated during the greatest part of the engine revolution and consequently cannot provoke any misfiring.

Lastly, the invention relates to an ignition system for internal combustion engines, having a magneto which induces a charging alternating voltage, depending on the rotary position of the engine, for an energy accumulating means which is discharged, preferably through the primary coil of a spark transformer, by a triggering switch operated in phase with the alternating voltage.

In the ignition systems explained above (process and arrangement) attention is paid particularly to a spark advance that increases as the speed increases. In internal combustion engines which are used, for example, in lawn mowers or chain saws, there also exists the need to prevent exceeding a top rotatory speed.

To solve the problem of speed limiting, in the case of an ignition system with the above-named features, it is proposed in accordance with the invention to provide a timer module which reacts to the alternating voltage with the production of a blocking signal to the firing switch, and keeps the blocking signal active during a time interval which is selected on the basis of a top speed limit for the engine.

Periodically with every engine revolution, when a certain angular position is reached, a series of alternating voltage half-waves are triggered (as described in the older citation described above) which serve for the charging of the energy accumulating means and/or the triggering of the spark through the spark switch that discharges the energy accumulating means. On the basis of the occurrence of the alternating voltage, the timer module is simultaneously set up or started for the generation of a preset constant time span. With increasing rotatory speed, the period with which the alternating voltage regularly occurs becomes shorter, but the time span generated by the timer remains constant. If the period for the regular occurrence of the alternating voltage falls below the generated time span, ignition is blocked on account of the blocking signal given by the timer to the spark switch, so that no further increase of the speed is possible. Not until the end of a generated time span does the timer inactivate the blocking signal, thereby again releasing additional ignitions. The latter take place with the renewed occurrence of induced alternating voltage and at the same time the timer is started for the resumption of the generation of the preset time span or period, with the simultaneous setting of the blocking signal.

In further development of this ignition system according to the invention, components such as preselecting counters, time switches or monostable multivibrators, known in themselves and marketed at low cost, are suitable to serve as the timer, and each of them is wired so that they are resettable to their initial or starting state by means of the alternating voltage. On the other hand, it is also within the scope of the invention to design the timer in software, namely to implement it in a microcomputer as a software routine, which can be done using a programmable counter component known in itself; to permit the resetting and starting of the timer in synchronism with the alternating voltage, sensing means known in themselves (threshold comparators, A/D converters) can be provided to detect the occurrence of the alternating voltage.

In synchronizing the operation of the timer with the alternating voltage the problem arises of processing it to make it suitable for detection by the timer and/or to shape it for signal detection. To solve this problem, in further development of the invention, a matching module or network is proposed by means of which one or more alternating voltage half-waves are selected for each engine revolution, rectified and/or inverted as necessary, and fed to the timer in its reset input.

Advantageously, every half-wave, on its way to the timer starting or resetting input, passes through at least one delay circuit which produces a time-delay corresponding to the minimum actuating time of the spark switch. The advantage is that any incorrect starting or resetting of the timer and the premature cut-out of the spark switch which it might entail is largely prevented; spikes originating in the firing of the spark cannot reset the timer to block the ignition until the energy accumulating means for the ignition has been sufficiently discharged, for which the spark switch requires a minimum amount of time. Thus the provision of time-delay circuits serves to improve the reliability and safety of the ignition.

In order to assure a rapid, virtually undelayed spark in connection with time-delay circuits in the low or medium speed range, provision is made according to a further development so that at least one half-wave per engine revolution, preferably the first half-wave of the alternating voltage, will be fed to the timer additionally with a logical AND configuration to its blocking signal output. If the timer has withdrawn the blocking signal due to the expiry of the time which it has generated, the information resulting from the alternating voltage half-wave is weighted or rated as a logical "null" due to the AND configuration, so that the timer will not be restarted or the blocking signal to the spark switch will not be reset. If the gas engine is running close to its upper speed limit, data resulting from half-waves are weighted or rated as logical "one" so that the starting or resetting input of the timer and hence the blocking signal become reactivated immediately. If the magneto produces more than two half-waves per engine revolution, the time intervals between the second and subsequent half-waves become longer than between the first and second half-wave on account of hysteresis losses. This phenomenon becomes especially apparent in the low or bottom speed range of the engine. In order to span the said greater time interval, according to an advantageous further development of the invention, a memory element, for example a flip-flop, is provided which stores a mark signal fed to the timer to reset it, and it is charged by one half-wave and erased by another either preceding or following half-wave. In this manner the resetting information for the timer resulting from the second and, in some cases, subsequent half-waves is retained until the directly adjacent half-wave arrives; during the time interval between the two successive half-waves the timer is held always in the resetting or starting state, so that the blocking signal remains suppressed and the ignition can freely proceed.

For the achievement of compact construction for use in small engines it is advantageous if, according to a further development of the invention, the matching module, including the delay circuits, AND gates and/or memory element, if any, is combined structurally with the timer in an integrated circuit. To permit "on-site" use, where there is no possibility of connection to power mains, another desirable further development consists in providing an additional energy accumulating means to supply power to the timer module and/or to the matching module or integrated circuit if used, which is charged by the alternating voltage induced by the magneto. Since in this manner the engine power is used indirectly for power generation no separate battery element is necessary.

In the synchronization of timer operation and induced alternating voltage the problem arises of converting the alternating current and its half-waves into signals usable by the timer, which are unipolar with respect to reference potential for the use of known digital technology. In this regard, a further development of the invention consists in feeding to the matching module alternating voltage half-waves which are taken both from the one pole and from the opposite pole of an induction coil. Thus the voltages induced in the induction coil with opposite signs are given identical directions in relation to the matching module and its reference potential. Alternatively, the negative alternating voltage half-wave can be fed to the matching module through an inverter, for example in the form of a pnp transistor in the emitter circuit.

To enable the timer to act on the spark switch with its blocking signal, a blocking circuit is connected to the output of the timer, according to a further development of the invention, which, when operated or actuated by the blocking signal short-circuits the actuating input of the spark switch to the ground. If alternating voltage then reaches the actuating input, the latter, too, is short-circuited and thus cannot produce a spark.

Before the speed limiting by the timer starts, a retardation of the spark with respect to a reference rotary position of the engine (e.g., top dead center) is to take place, this can be performed within the scope of the invention as follows: a delay module, in the form for example of an RC low-pass circuit, is made to precede directly the response, start and reset input of the timer if any, whose time constant governing the retardation is selected with an eye to the desired retardation of the moment of ignition and acts directly in the vicinity of the top rotary speed of the engine. In this vicinity, if upon the occurrence of alternating voltage the time period or delay time generated by the timer has already run out except for a small residual time, the delay circuit delays the entry of a reset or start signal into the timer beyond the remaining time period, so that a retarded spark can still be fired.

Advantageously a pulse or cycle generator is provided as a time reference for the timer module, and its cycling or pulse output is fed, after a logical AND connection with the blocking signal of the timer module, to a corresponding counting means. Especially when the timer module is embodied in a counter module, the blocking signal produced by it can also prevent entry of the pulses from the cycle generator which are to be counted, inasmuch as the AND gate serving as a gate to the counter input is blocked.

To stabilize the idle speed of the engine a reduction of the spark advance (see the citation given in the beginning) is advantageous. In this regard a further development according to the invention consists in the fact that the timer module reacts to the alternating voltage with the production of an additional, separate delay signal for the delayed actuation of the spark switch; this delay signal is produced for the duration of a second, longer time interval which corresponds to a bottom limit of the rotary speed, preferably the idle speed, of the engine. In this manner, at the bottom speed limit, especially the idle speed, a break in the ignition curve of the engine is produced, which has a desirable effect on stability in idling. The delayed actuation of the spark switch can be achieved advantageously with a delay circuit which is activated by the delay signal from the timer. The induced alternating voltage is then fed with a delay through the delay circuit, e.g., an RC low-pass filter, to the actuating input of the spark switch to trigger it. Especially when the timer module is designed on the basis of a preselecting counter module, the preselected number at which the delay signal is produced when it is reached must be higher than the preselected number for the blocking signal. Therefore the timer module, especially the counter module, must not stop counting when the preselected number for the blocking signal is reached. A further development of the invention provides for this by the fact that the cycling or pulse output of the said cycling or pulse generator has an AND configuration only with the delay signal.

Additional features, details and advantages of the invention will be found in the following description of preferred embodiments of the invention, with the aid of the drawing, wherein:

BRIEF DESCRIPTION OF THE DRAWINGS

FIG. 2 shows a circuit embodiment of the invention, FIGS. 3(a-e) show voltage/time diagrams with regard to voltage half-waves induced by the magneto, and diagrams of input and output signals of a flip-flop circuit used in accordance with the invention.

DESCRIPTION OF THE PREFERRED EMBODIMENTS

Figure 1:
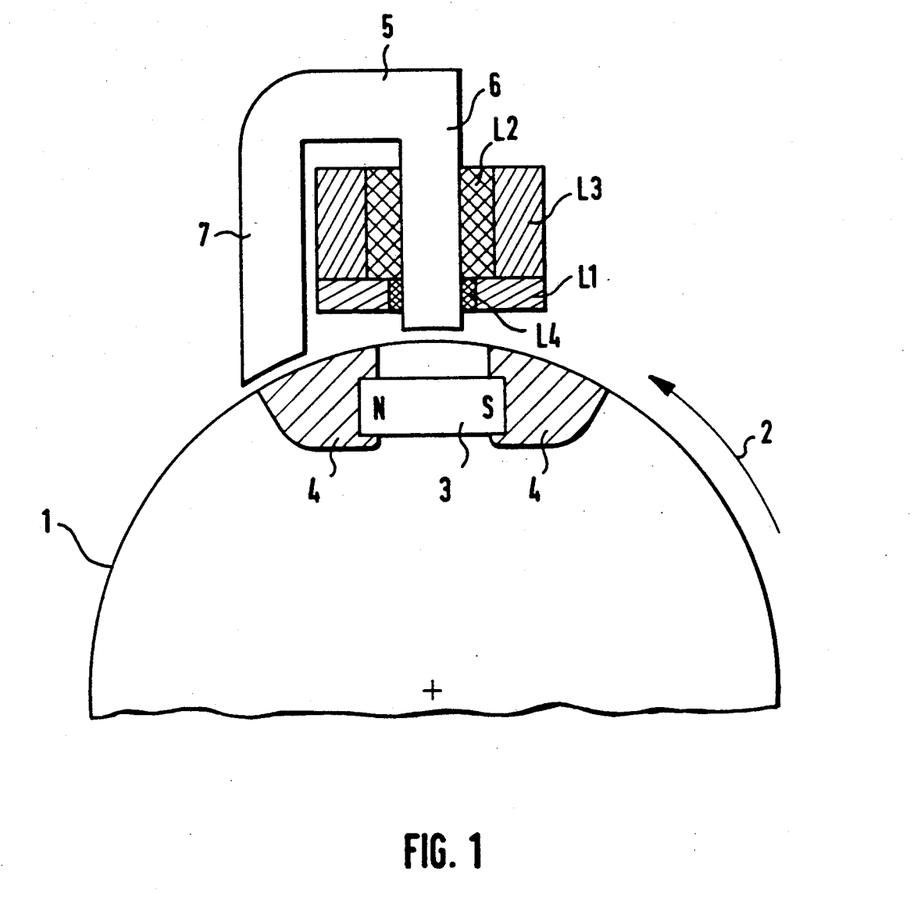
FIG. 1 is an axial view of a construction of the magneto which is advantageous for the invention.

The magneto represented in FIG. 1 has a pole wheel 1 which is rotated in the counterclockwise direction 2 by the engine (not represented). On its outer circumference there is a permanent magnet 3 with tangentially offset poles N and S, which magnetize correspondingly arranged pole shoes 4. In the rotation 2, this system of magnets 3, 4, is moved past a U-shaped ferromagnetic iron core 5 whose first leg 6 is surrounded by a coil system L1, L2, L3, L4, and whose second leg 7 has no coils. The coil system consists of four coils L1 to L4 arranged concentrically about the first leg 6. Their operation will be apparent from the explanations given with the aid of the additional figures showing circuits and signal/time diagrams.

Figure 2:
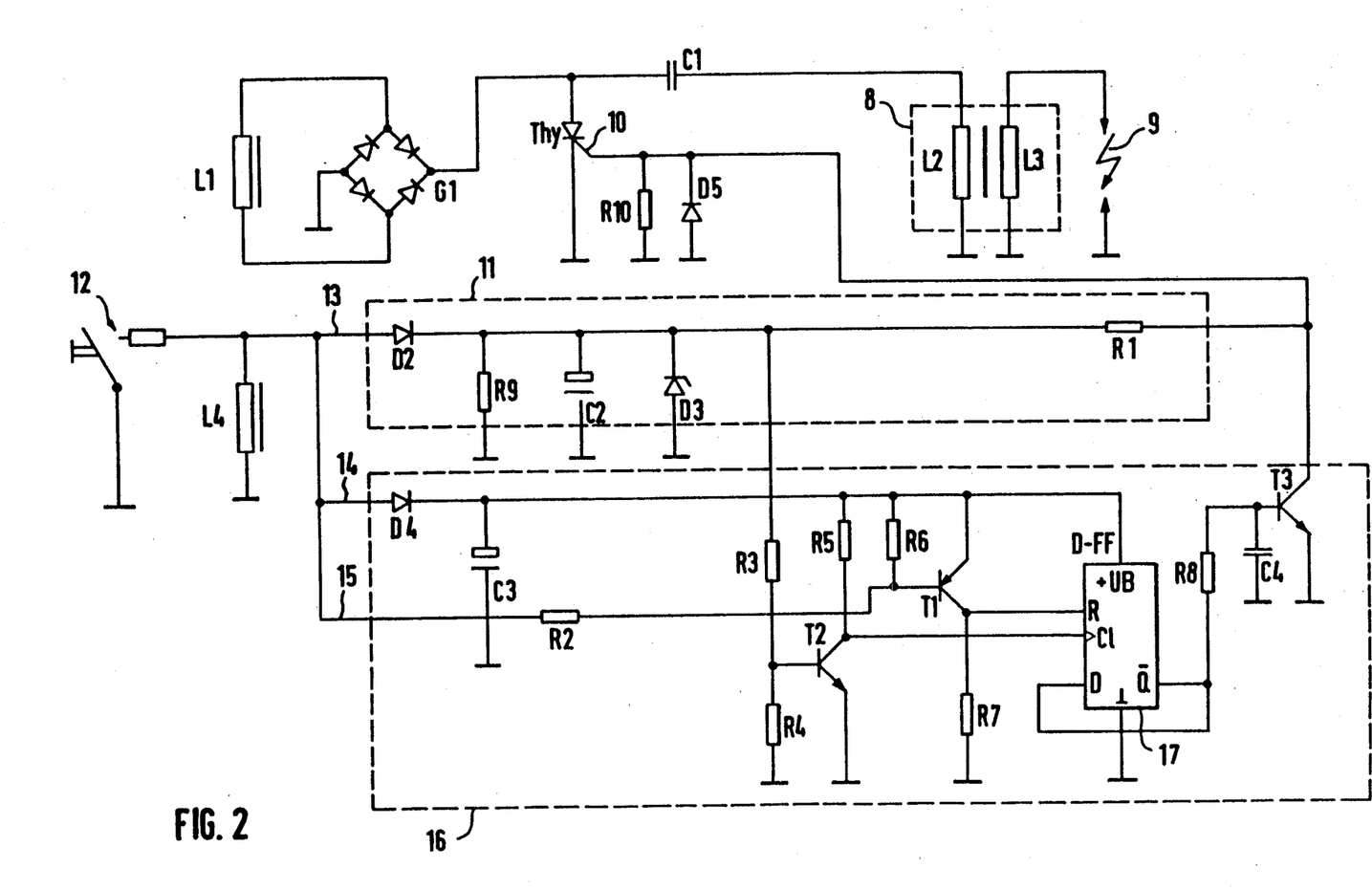
Figure 3:
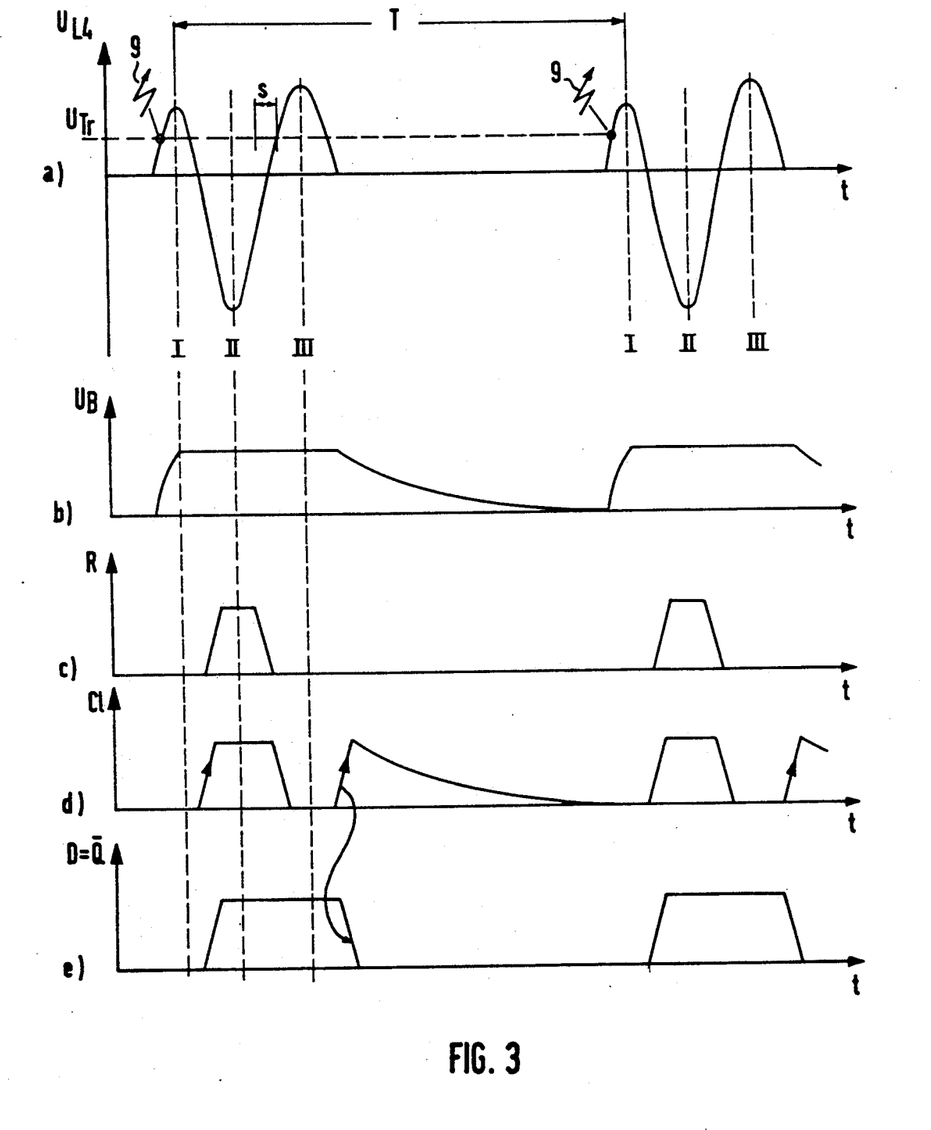

Referring to FIG. 2, the first charging coil L1 charges a spark condenser C1 through a full-wave rectifier G1 in a bridge circuit, for example. The second coil L2 and third coil L3 together form the primary and secondary windings, respectively, of a spark transformer 8. The primary coil L2 is in series with the spark condenser C1 upon whose discharge through a switch Thy in the form of a thyristor at the output of the spark transformer 8 a high-voltage spark signal 9 is formed. The control or actuating input 10 of the switch Thy is connected to the output of a trigger system 11 (indicated in broken lines) with which a fourth coil L4 is associated as the trigger coil. Furthermore, the control input 10 of the switch Thy is grounded through a protective resistor R10 and a protective diode D5 connected in parallel. In the coil system L1 to L4, coherent and alternately polarized voltage half-waves are produced in a known manner, as represented in FIG. 3, diagram a. A cutout switch 12 to ground is connected in parallel with the trigger coil L4, and short-circuits the trigger coil L4 when closed. Between the trigger coil L4 and the control input 10 of the switch Thy, a diode D2 admitting only positive half-waves is connected in series with a current limiting resistance R1. Between this diode D2 and the current limiting resistance R1 a parallel circuit consisting of the resistor R9, the polarized condenser C2 and the Zener diode D3 is connected to ground. This parallel-connected network serves on the one hand to smooth pulses originating from the trigger coil L4, and on the other hand for voltage stabilization.

Two inputs 14, 15, of a bistable multivibrator 16 are connected to the output of the trigger coil L4, parallel to the input 13 of the trigger system 11. The heart of the bistable multivibrator is formed by an integrated-circuit data flip-flop 17 with a positively flank-triggered cycling input Cl which is operated as a toggling unit by feeding its inverting output Q back to its data input D. The voltage supply to the input $U_B$ of the flip-flop 17 is derived from the first input 14 of the bistable multivibrator 16 as follows: A polarized condenser C3 is charged with respect to ground through a diode D4 admitting only the positive voltage half-waves from the trigger coil L4; it then constitutes the supply voltage $U_B$ to the flip-flop 17. To its cycling input C1 is connected the output of an inverting element formed by an npn transistor T2 in a common-emitter circuit whose collector is connected via the collector resistor R5 to the power supply potential of flip-flop 17 and of the power supply condenser C3. The control or base signal of the transistor T2 is fed through a voltage divider R3, R4, connected between the ground and the Zener diode D3 of the trigger system 11.

The reset input R of flip-flop 17 is connected to the output of another inverting circuit element consisting of the pnp transistor T1 in a common-emitter circuit with grounded collector resistor R7. The control or base input of this pnp transistor T1 is controlled through a voltage divider R2, R6, which is connected at one end thereof to the output of the trigger coil L4 and at the other end to the power supply from the power supply condenser C3. Its power supply potential is fed to the emitter of the pnp transistor T1.

The inverting output Q of the flip-flop 17 actuates through a delaying RC low-pass filter R8, C4, a short-circuit switch constituted by an npn transistor T3 in a common-emitter circuit, which then short-circuits to ground the output or control input 10 of the switch Thy.

For the manner of operation of this embodiment of an ignition system according to the invention, reference is made to the signal/time diagrams a) to e) in FIG. 3:

According to diagram a), when the north pole N of the permanent magnet 3 moves past the first leg 6 of the U-shaped iron core 5 bearing the coil system including the trigger coil L4, a voltage half-wave I of positive polarity is induced in the trigger coil L4. After leaving the first leg 6 the north pole N is moved by the rotation 2 of the pole wheel 1 to the second, unwound leg 7, while the south pole S is driven past the first leg 6. This results in a complete reversal of the magnetism of the iron core 5, whereupon the second voltage half-wave II of opposite polarity and greater amplitude is formed. As the north pole N comes out of reach of the second leg 7 as rotation 2 continues, the second leg 7 is then magnetized by the south pole S of the permanent magnet 3, and again a change of the magnetic flux through the coil arrangement is produced; that is, an additional voltage half-wave III is induced, whose polarity is the opposite of that of the second voltage half-wave II. When, due to rotation 2, the south pole S comes out of the reach of legs 6 and 7 of the U-shaped core 5, a residual magnetism of positive polarity remains in the core due to the magnetization hysteresis. After one complete revolution of the pole wheel 1, the above-described cycle of voltage half-waves I-II-III with the period T is repeated. As explained above, the dynamic characteristic of the ignition system leads to a lengthening of the second half-wave II and third half-wave III, which is manifested by a delayed passage through the trigger threshold $U_{Tr}$ with the delay s by the initial flank of the third half-wave III.

According to the present embodiment, the trigger coil L4, on the ascending flank of the first half-wave I, supplies upon passing through the trigger threshold $U_{Tr}$ a firing pulse through the diode D2 and the output resistor R1 to the control input 10 of the switch Thy. In the first rotation of the pole wheel 1, the spark condenser C1 is not yet charged, and therefore in the first passage of pole wheel 1 past the coil system no spark is fired, and instead the spark condenser C1 and the power supply condenser C3 are charged (cf. diagram b). The subsequent second half-wave II of negative polarity in the trigger coil L4 makes the pnp transistor T1 conductive through the resistor R2 of the voltage divider R2, R6, so that the flip-flop 17 is reset (cf. diagram c in FIG. 3). Thus the inverting output Q of the flip-flop 17 goes to positive potential, so that the short-circuiting switch is closed by the transistor T3 in a common-emitter circuit (cf. diagram e) on the basis of the second half-wave II. In this situation any operation of the switch Thy to produce the spark 9 is impossible, and especially the following third half-wave III from the trigger coil L4 cannot fire a spark. The third half-wave III, however, actuates the inverting circuit element with the npn transistor T2 through the gate diode D2 and the input voltage divider R3, R4, while the cycling input Cl of the flip-flop 17, which previously rose to positive potential with the second voltage half-wave II, is reduced to ground potential. With the descending flank of the third half-wave III, the actuating voltage of the transistor T2 established by the voltage divider R3, R4, falls short and the transistor then blocks. Thus, through the collector resistor R5 of circuit element or transistor T2 a positive potential is applied to the cycling input Cl of flip-flop 17, and so an ascending flank is produced (cf. diagram d) for the signal curve at the cycling input Cl. On account of the ascending flank of the cycle the inverting output Q of the flip-flop 17 changes its level, which previously was at a positive potential, to a low potential. As a result the short-circuit switch T3 is ungrounded and the first half-wave I within the first revolution is not shorted but reaches the control input 10 of the switch Thy. This signifies that the spark 9 is fired with the ascending flank of the first half-wave I, and the spark condenser C1 is discharged through the primary coil L2 of the spark transformer 8. The spark forming at the spark plug (not shown) might undesirably shift the flip-flop 17 to another state. This is countered, as already described, by the reset pulse at input R of the flip-flop 17 on the basis of half-wave II immediately before it is set to fire the spark (cf. especially diagrams a and c). Since the power supply for the bistable multivibrator 16 is tied to the occurrence of the three voltage half-waves I, II and III, it decreases during the period of the last half-wave III and the first half-wave following within the next revolution; thus the bistable multivibrator is inactivated and cannot cause any ignition for periods outside of the voltage half-waves I to III.

The idea of the invention goes beyond the special embodiment just described. The operations of the above trigger system 11 and/or of the bistable multivibrator 16 can be performed by appropriate software, taking place in a microcomputer, especially one with flag registers or corresponding reserved memory cells. The half-waves from the trigger coil could be detected by an analog-to-digital converter in the microcomputer. Also, a fixed permanent magnet can be provided in the magneto instead of a rotating permanent magnet, while instead of the pole wheel a yoke wheel is used with projecting tooth-like segments for completing the magnetic circuit.

Figure 4:
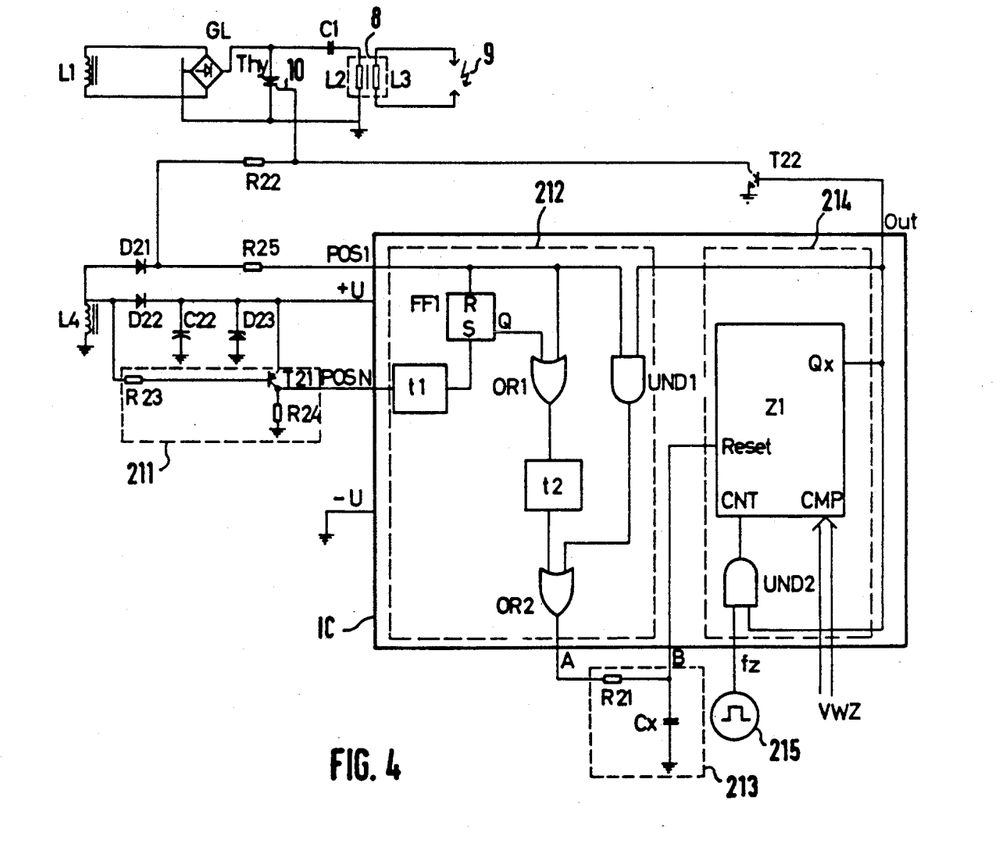
FIG. 4 shows an additional circuit embodiment of the invention.

According to the modification of FIG. 4, the control or actuating input 10 of the spark switch Thy is connected indirectly through the ohmic resistor R22 and the diode D21 next to it to one pole terminal of the fourth trigger coil L4—the one serving to trigger the spark 9—whose opposite pole terminal is at the reference potential or ground. On account of the diode D21 admitting only positive alternating voltage half-waves, the switch Thy is closed through its actuating input 10 only in the case of half-waves in the trigger coil L4 which are induced positively with respect to the reference potential. From these half-waves, furthermore, a supply voltage +U is derived for the integrated circuit IC through an additional diode D22 admitting positive half-waves, in conjunction with the following parallel circuit of the polarized supply condenser C22 and the voltage stabilizing Zener diode D23. The integrated circuit IC with its additional supply input —U is at the same reference potential as the trigger coil L4 and has an input POS1 for positive alternating voltage half-waves from the trigger coil L4 and an input POSN for negative ones. The input POS1 is connected through the ohmic resistance R25 to the cathode of the first-mentioned diode D21 admitting positive half-waves. Alternating voltage half-waves induced negatively with respect to reference potential or ground are inverted by means of an inverting circuit 211 and fed inverted to the second-mentioned circuit input POSN. The inverting circuit 211 in the example given in the drawing is formed by the pnp transistor T21 disposed in the emitter circuit, and is controlled from the signal pole terminal of the trigger coil L4 through a resistor R23 upon the occurrence of negative half waves at its base, and at the collector side forwards them to the input POSN; the resistor R24 between collector and ground serves to produce the corresponding voltage drop.

Important functional units of the integrated circuit IC are the matching module 212 and the preselecting counter Z1 serving in the example as the timer 214. The positive half-wave input POS1 is fed within the matching module 212 to the reset input of an RS flip-flop FF1 and to the inputs of an OR gate OR1 and an AND gate UND1. The input POSN for (originally) negative half-waves leads through a time delay circuit t1 to the set input S of the RS flip-flop FF1. Its output Q is connected to the second input of the previously mentioned OR gate OR1. The second input of this gate OR2 is directly connected to the output of the above-mentioned AND gate UND1, which connects the output Qx of the preselect counter Z1 with the signal from the input POS1.

The second-named OR gate OR2 forms, for the integrated circuit IC, an output A which is connected through an external delay circuit 213 (in this example an RC low-pass filter with the resistance R21 in series and the grounded condenser Cx) to an additional input B of the integrated circuit IC. Input B serves to produce a start and reset signal for the timer module 214 or preselecting counter Z1. The timer module 214 includes, in addition to the preselecting counter Z1, a second AND gate UND2 by means of which the pulse series corresponding to a counting frequency $f_z$ of an external cycle generator 214 has an AND connection to the output Qx of the preselecting counter Z1 and is fed to its counting input CNT. Therefore the counting process is stopped when the preselecting counter Z1 detects through its input CMP a positive result of comparison with an externally set preselected number VWZ and thereupon inactivates its output signal Qx or resets it. The preselected number VWZ permits a rough setting of the preselecting counter Z1 by establishing its counting steps; the fine setting can be made by varying the counting frequency $f_z$ from the cycle generator.

The output signal Qx also forms the blocking signal output Out of the integrated circuit IC which controls the blocking switch T22, formed from an npn transistor in a common-emitter circuit. The blocking switch T22, when actuated by the activated blocking signal output Out, connects the actuating input 10 of the spark switch Thy to the ground or reference potential to prevent ignition.

Figure 5:
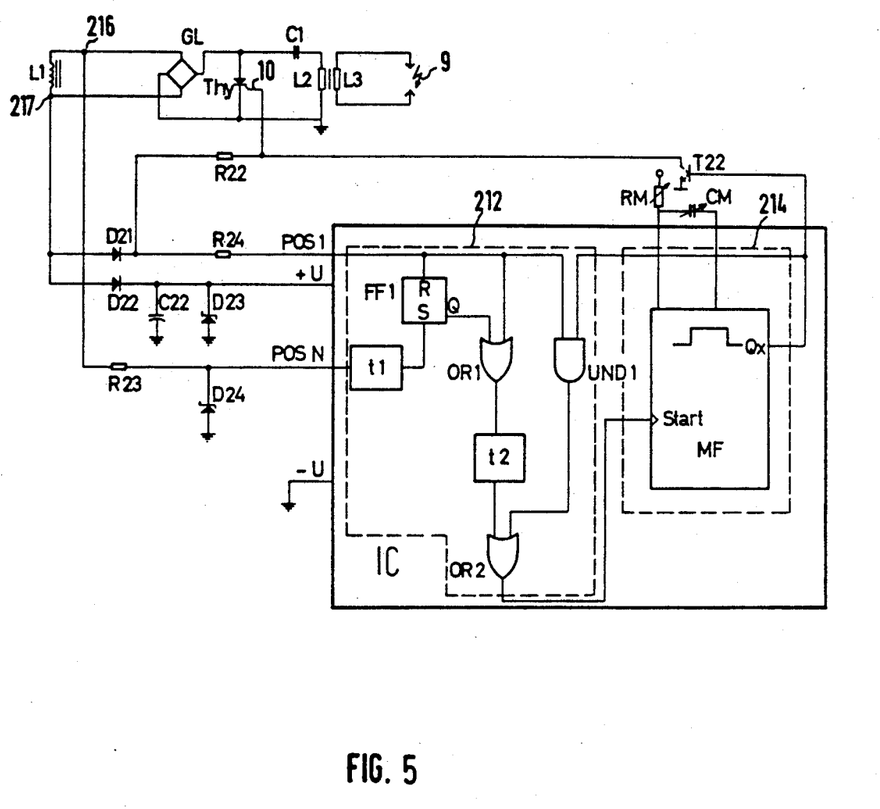
FIG. 5 shows still another circuit embodiment of the invention, FIGS. 6(a-c) show the manner of the operation of the circuits of FIG. 4 and/or FIG. 5, with the aid of the pulse diagrams a)-c)

The circuit modification shown in FIG. 5 is a modification of the one in FIG. 4 as follows: On the one hand negative voltage half-waves are obtained by taking them directly from a pole terminal 216 of the charging coil L1, followed by delivery in a direction that is positive in relation to reference potential, to the corresponding circuit input POSN as positive signals for the matching module 212 connected to its output. If voltage half-waves of inverse polarity occur at the source point or pole terminal 216 of the charging coil L1, they are shorted to ground by the diode D24. Consequently the transistor T21 and the resistor R24 in FIG. 4 can be omitted. On the other hand, the preselecting counter Z1 with AND gate UND2 used in FIG. 4 are here replaced by a monostable multivibrator MF to form the timer module 214. The monostable multivibrator MF is wired externally with a resistance $R_M$ and a condenser $C_M$ by the sizes or settings of which the duration of the unstable state of the monostable multivibrator and hence the time interval generated by the timer for the activation of the blocking signal output Out can be selected. Lastly, the external delay circuit (cf. No. 213 in FIG. 4) is omitted and instead the output of the OR gate OR2 is delivered directly to the start input of the monostable multivibrator MF and timer 214.

The operation of the circuit of FIG. 4 will now be explained in reference to the signal/time diagrams in FIG. 6.

Figure 6A:
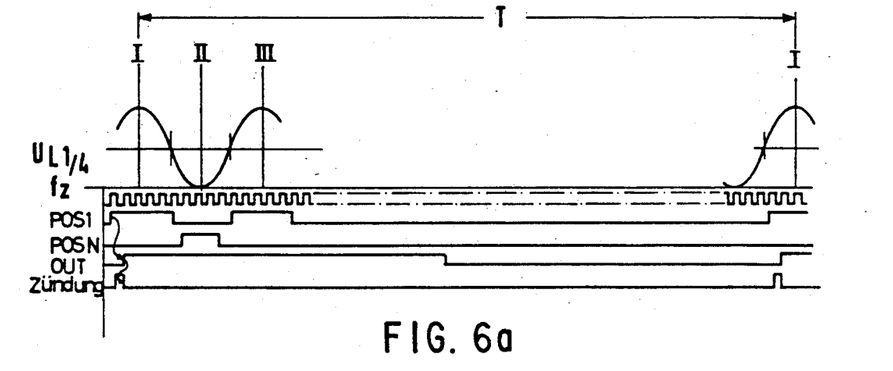

According to diagram 6a, when the north pole N of permanent magnet 3 moves past the first leg 6 of the U-shaped iron core 5 (see FIG. 1), which is wound with the coil system including the trigger coil L4, a voltage half-wave I' of positive polarity is induced in the charging coil L1 and trigger coil L4. When the north pole N, after leaving the vicinity of the first leg 6 due to the rotation 2, passes the second, unwound leg 7, the south pole S at the same time comes into the vicinity of the first leg 6. This leads to a complete inversion of the magnetism of iron core 5, whereupon the second voltage half-wave II' of opposite polarity and greater amplitude is produced. As rotation 2 continues, when the north pole N leaves the vicinity of the second leg 7, which the south pole S then magnetizes accordingly, a change of the magnetic flux through the coil system is produced; this leads to the induction of an additional voltage half-wave III' whose polarity is the opposite of that of the second voltage half-wave II'. On account of the necessary magnetic inversions the voltage half-waves II' and III' are farther apart in time from one another than the voltage half-waves I' and II' (not shown). After one complete revolution of the pole wheel the above-described voltage half-wave cycle I'-II'-III' is repeated with the period T.

The unipolar pulse series at the circuit input POS1 corresponds to the positive voltage half-waves I' and III', and the similar pulse series at the circuit input POSN corresponds to the negative half-wave II'. In the example given in Diagram a, upon the occurrence of the first POS1 pulse the blocking signal Out had already been reset, i.e., to logical "0," on account of the expiration of the timer's time interval. Now the first POS1 pulse, after passing through the OR gate OR1, the delay circuit t2 and the second OR gate OR2, produces the resetting and starting of the timer 14 (cf. FIG. 4). According to Diagram 6a, this first POS1 pulse therefore causes the blocking signal Out to be set with the corresponding time delay. Therefore the spark previously triggered by the first POS1 pulse is immediately suppressed.

Figure 6B:
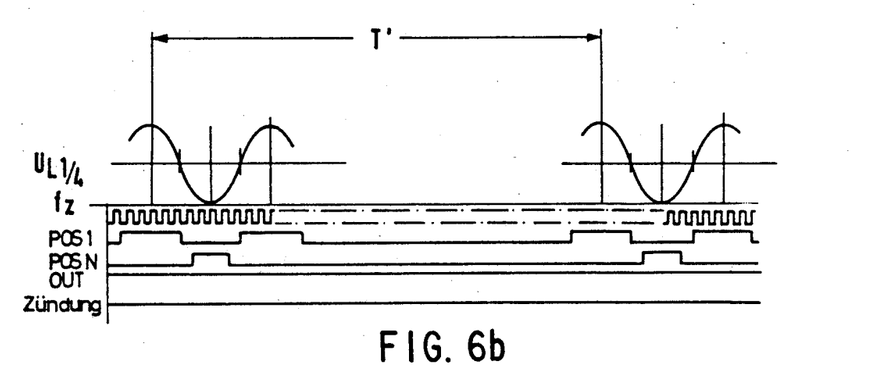

According to Diagram 6b, the rotatory speed of the gas engine has increased, so that the alternating voltage half-waves I', II' and III' occur with the period T' shortened in comparison with Diagram 6a. This period is so short that, when the first POS1 pulse occurs, the preselecting counter Z1, in counting off the pulses from the cycle generator 215 which are based on the counting frequency $f_z$, has not yet reached the preselected number VWZ (cf. FIG. 4) for speed limiting, i.e., it continues to run. So it is then reset or started, as the case may be, by the three half-waves I', II', III', via the inputs POS1 and POSN, the memory unit FF1 with time delay circuit t1 and the gates OR1, OR2 with time delay circuit t2. After the third half-wave III the preselecting counter Z1 resumes counting. Consequently, in the preselecting counter Z1, when the period T' of the alternating voltage cycle I'-II'-III' is exceeded, the counting operation prevails, so that the blocking signal Out continually prevents ignition.

Figure 6C:
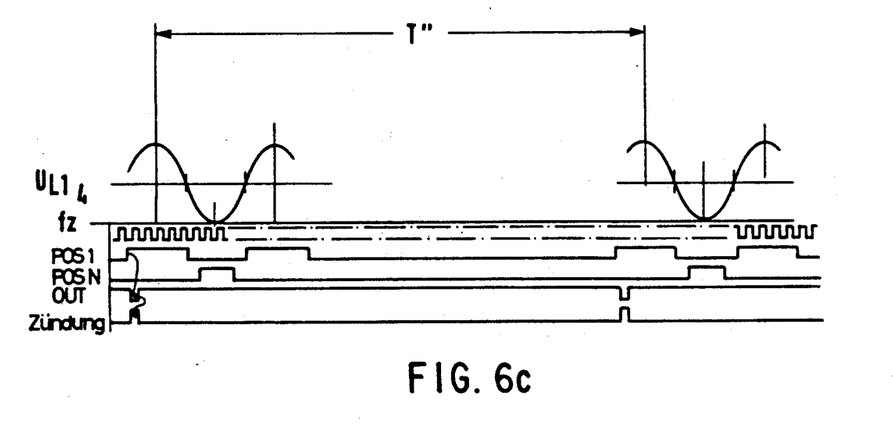

According to Diagram 6c, the gas engine is in a speed range that is between that of Diagram 6a and that of Diagram 6b; in other words, $$T < T' < T.$$

In that case the corresponding period T" exceeds the time interval produced by the timer by so few counting steps that the blocking signal Out is still withheld for the duration of the first POS1 pulse of a period T"'. On account of the delay circuit 213 of FIG. 4, this first POS1 pulse is bridged over with a time delay to the start or reset input of the preselecting counter Z1 and timer 214. The first POS1 pulse cannot immediately reset the timer 214 and preselecting counter Z1 via the AND gate UND1, because it is delayed by the delay circuit 213. When the preselecting counter then reaches its final value (preselected number VWZ), while the first POS1 pulse is still present, the blocking signal Out becomes inactive and the spark switch Thy can be actuated. The spark therefore occurred a certain time after the arrival of the first POS1 pulse. Since this pulse is in a fixed relation to the crankshaft position of the gas engine, the spark is retarded in accordance with Diagram 6c. The time delay by the delay circuit 213 is sufficient so that the spark 9 started upon the occurrence of the first POS1 pulse can fully develop until it is then terminated at the end of the time delay by (another) occurrence of the blocking signal Out.

Figure 7:
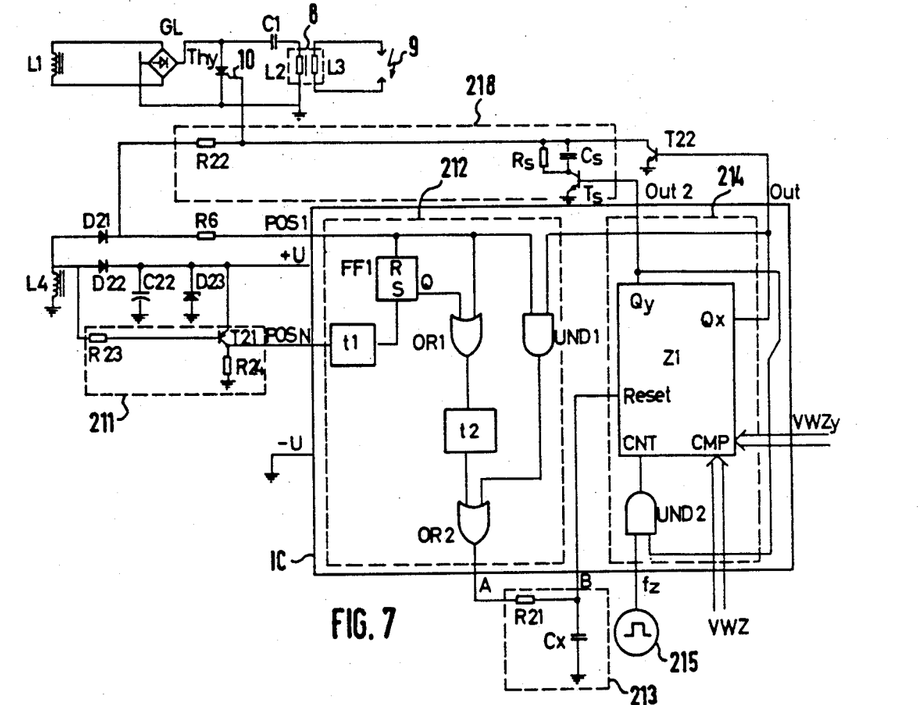
FIG. 7 shows another modified circuit embodiment of the invention.

The modification circuit in FIG. 7 differs from the one in FIG. 4 in that the functions of the timer module 214 are expanded: The preselecting counter 21 used in the example is in active connection through its comparing input CMP to an additional externally set preselected number VWZy. If, in counting the pulses or count frequency $f_z$, a positive comparison result with regard to the second preselected number VWZy arrives from the cycle generator 215, this is indicated by the setting of a second signal output Qy of the counter circuit Z1; this takes place similarly to the setting of the first signal output Qx with regard to the first preselected number VWZ. The second output signal Qy is formed by the delay signal Out2 produced by the timer module 214, and in the set or active state it activates an additional delay circuit 218 consisting of the resistances $R_2$, $R_s$, the condenser $C_S$ and the switching transistor $T_S$. For this purpose the delay signal output Out2 is connected to the base of the switching transistor $T_S$. If the latter is actuated by the delay signal Out2, it grounds the parallel circuit consisting of resistance $R_S$ and the condenser $C_S$. The condenser $C_S$ then forms together with the resistance $R_{22}$ an RC low-pass filter through which positive voltage half-waves issuing from the trigger coil L4 and passing through the diode D21 reach, with a delay, the actuating input 10 of the spark switch or thyristor Thy. Thus the discharge of the storage condenser c1 and the spark 9 produced thereby is retarded in accordance with the time constant of the RC low-pass filter or delay line 218.

This can be utilized to advantage for stabilizing the idle speed of the gas engine, if the preselected number VWZy is greater with respect to the second counter output Qy than the preselected number VWZ with respect to the first counter output Qx. In other words, if $$VWZy > VWZ$$

But to prevent the counter module Z1 from being stopped on the basis of this circumstance when the smaller preselected number VWZ is reached, as it is in FIG. 4, so that the specified production of the delay signal Out2 by the second counter output Qy will still be assured, the latter is tied in a logical AND configuration to the counting frequency fz from the cycle generator 215 through the gate UND2.

Figure 8:
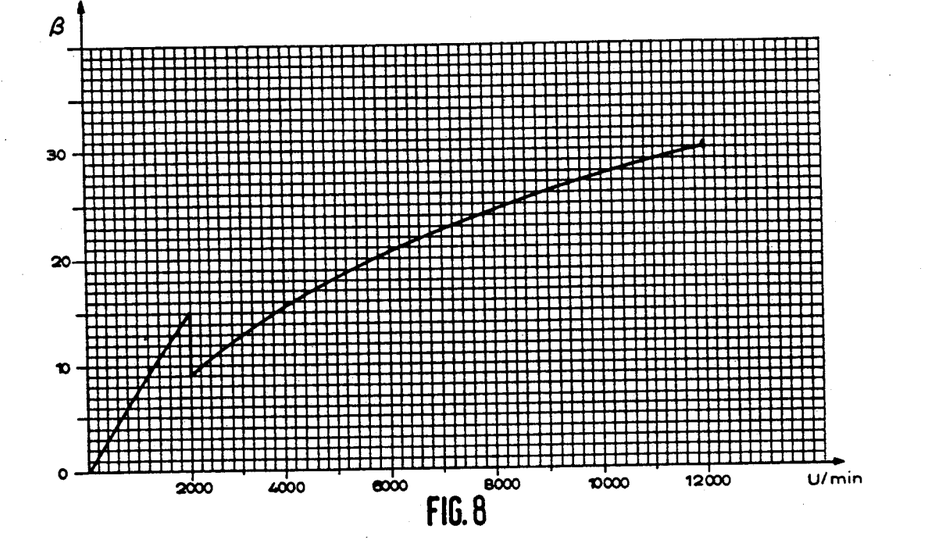
FIG. 8 shows the ignition adjustment curve for the operation of the internal combustion engine, resulting from the circuit variant of FIG. 7.

The manner of operation of the circuit modification in FIG. 7 will be further explained with the aid of FIG. 8, which shows the spark angle advance beta in degrees over the speed in revolutions per minute. Here the preselected number VWZy is adjusted so that the delay signal Out2 is "low", i.e., inactive, up to a speed of about 2000 rpm. At about 2000 rpm the second output of the counter Z1 becomes "active high," i.e., is set, and the additional delay circuit 218 is inserted by means of the inserted switching transistor $T_s$. This produces a break in the ignition timing curve at 2000 rpm, which serves for the stabilization of the idle speed. The advancing of the spark thus reduced increases with increasing speed until 12,000 rpm is reached. This speed corresponds to the value of the first preselected number VWZ, at which, when it is reached, the spark 9 is blocked, as explained above. The second preselected number VWZy can also be achieved by the use of internal divider stages within the counter module Z1. In this manner no separate input for the second preselected number is necessary.

What I claim is:

1. In an ignition method for internal combustion engines, comprising inducing, with a magneto, a plurality of alternating voltage half-waves (I, II, III) for each engine revolution (T), to charge an energy storage element (C1) and discharge the storage element by a switch means (Thy) through the primary coil (L2) of an ignition transformer (L2, L3), the improvement comprising actuating the switch means (Thy) when the rising flank of the first half-wave (I) reaches a trigger threshold ($U_{Tr}$) during each revolution (T), and blocking at least one of the half-waves (II, III) following the first half-wave (I), by stopping actuation of the switch means (Thy).

2. In a condenser ignition system for internal combustion engines, the ignition system having a magneto for inducing alternating voltages dependent upon rotary speed, and a triggering device (11) for sensing the alternating voltages (I, II, III) for the actuation of a switch (Thy) for discharging the ignition condenser (C1) through the primary coil (L2) of an ignition transformer (L2, L3), the improvement comprising a bistable multivibrator (16) connected to be responsive to the last alternating voltage half-wave (III) for shifting within each engine revolution (T) to a state for the release of the actuation of the switch (Thy) during the first half-wave (I) of the next revolution.

3. In a condenser ignition system according to claim 2, comprising means for setting the bistable multivibrator (16) to the release state at the end or the end flank of the last half-wave (III).

4. In a condenser ignition system according to claim 2, comprising means for shifting the bistable multivibrator (16) within each revolution (T) back to its original starting state in response to the second (II) and any following half-waves of equal polarity, to thereby block the actuation of the switch (Thy).

5. In a condenser ignition system according to claim 2, wherein the bistable multivibrator (16) has a single-flank-triggered toggle flip-flop (17) connected to be reset within each revolution (T) in response to the second (II) and any following half-waves of equal polarity, and comprising a clock cycle input for said multivibrator, whereby the last (III) and any preceding half-waves (i) of equal polarity control said multivibrator in response to the clock cycle input.

6. In a condenser ignition system according to claim 2, comprising a power supply ($U_B$) for the bistable multivibrator (16) connected to be responsive to the first and any subsequent of said half-waves (I, II, III).

7. In a condenser ignition system according to claim 2, wherein the bistable multivibrator (16) is connected in the back-shifted starting state to operate as a short-circuit switch (T3) for the suppression of induced triggering half-waves with respect to the switch (Thy).

8. In a condenser ignition system according to claim 7, wherein a delay circuit (R8, C4) is interposed between the bistable multivibrator (16) and the short-circuit switch.

9. In a condenser ignition system according to claim 2, wherein the magneto has a magnet pole wheel (1) coupled with the engine rotation, said magneto having tangentially offset poles (N, S) and a stationary coil system (L1 to L4) cooperating therewith and having a ferromagnetic iron core (5).

10. In a condenser ignition system according to claim 9, wherein the iron core (5) has two legs (6, 7) pointing toward the pole wheel, one (6) of which is surrounded by the coil system (L1 to L4) including a charging coil and a triggering coil (L1, L4).

11. In an ignition method for internal combustion engines, comprising inducing, with a magneto, a plurality of alternating voltage half-waves (I, II, III) for each engine revolution (T), to charge an energy storage element (C1) and discharge the storage element by a switch means (Thy) through the primary coil (L2) of an ignition transformer (L2, L3), the improvement comprising actuating the switch means (Thy) when the rising flank of the first half-wave (I) reaches a trigger threshold ($U_{Tr}$) during each revolution (T), and setting a flag with the last half-wave (III) within each revolution (T) such that it signals the release of the spark (9).

12. In an ignition method according to claim 11, comprising setting the flag with at least the second half-wave (II) of each revolution (T) for the purpose of blocking the spark (9).

* * * * *